United States Patent
Barykin et al.

(10) Patent No.: US 12,076,884 B2
(45) Date of Patent: Sep. 3, 2024

(54) HIGH VELOCITY OXY AIR FUEL THERMAL SPRAY APPARATUS

(71) Applicant: FUNDACION TECNALIA RESEARCH & INNOVATION

(72) Inventors: Georgiy Barykin, San Sebastián-Guipuzcoa (ES); Ignacio Fagoaga, San Sebastián-Guipuzcoa (ES); Maria Parco, San Sebastián-Guipuzcoa (ES); Carlos Vaquero, San Sebastián-Guipuzcoa (ES)

(73) Assignee: FUNDACION TECNALIA RESEARCH & INNOVATION, Guipuzcoa (ES)

( * ) Notice: Subject to any disclaimer, the term of this patent is extended or adjusted under 35 U.S.C. 154(b) by 192 days.

(21) Appl. No.: 17/083,633

(22) Filed: Oct. 29, 2020

(65) Prior Publication Data
US 2021/0122081 A1    Apr. 29, 2021

(30) Foreign Application Priority Data
Oct. 29, 2019    (EP) .................................... 19382945

(51) Int. Cl.
*B05B 7/20*    (2006.01)
*B28B 1/00*    (2006.01)
(Continued)

(52) U.S. Cl.
CPC .............. *B28B 1/001* (2013.01); *B05B 7/205* (2013.01); *B33Y 30/00* (2014.12); *C23C 4/129* (2016.01); *C23C 24/04* (2013.01)

(58) Field of Classification Search
None
See application file for complete search history.

(56) References Cited

U.S. PATENT DOCUMENTS

| | | | | |
|---|---|---|---|---|
| 4,622,007 A | * | 11/1986 | Gitman | B05B 7/205 239/419.3 |
| 5,005,764 A | * | 4/1991 | Simm | B05B 7/205 239/132.3 |

(Continued)

FOREIGN PATENT DOCUMENTS

| | | |
|---|---|---|
| DE | 103 57 440 A1 | 9/2004 |
| EP | 0 341 672 A1 | 11/1989 |
| EP | 0 621 079 A1 | 10/1994 |

*Primary Examiner* — Binu Thomas
(74) *Attorney, Agent, or Firm* — Snell & Wilmer LLP

(57) ABSTRACT

The apparatus comprises a labyrinth mixing device designed to mix a first oxidizer gas and a fuel under pressure, and to inject the mixture produced in a combustion chamber, a torch's main body (1) housing the labyrinth mixing device (2) and connectors (7) for fuel and oxidizer gases, a torch's front part (3) defining, with the labyrinth mixing device (2), the internal geometry of the combustion chamber (4) comprising several second oxidizer gas injectors (32,33) for injecting separately a second oxidizer gas upstream in the combustion chamber to promote the combustion process and connecting down-stream to a gas expanding nozzle (50) designed to receive products of combustion of said mixture and form a high-velocity gaseous jet, an ignition device (30) to start combustion of said mixture, a material delivery device (6) designed to inject an spray material axially into said high-velocity gaseous jet. The labyrinth mixing device (2) comprises one or more flanges (23,24) which define one or more mixing volumes (21,22) and holes (25,26,27), concentrically placed both on the flanges (23,24) and passing through the mixing device (2) and opening at the downstream end of the mixing device (2) for connecting a feeding section (20) of the labyrinth mixing device (2) with the combustion chamber (4). The labyrinth mixing device (2) comprises a crossing axial bore (28) to inject the spray material into the combustion chamber (4).

12 Claims, 7 Drawing Sheets

(51) Int. Cl.
   *B33Y 30/00*   (2015.01)
   *C23C 4/129*   (2016.01)
   *C23C 24/04*   (2006.01)

(56) References Cited

U.S. PATENT DOCUMENTS

| | | | | |
|---|---|---|---|---|
| 5,445,325 | A * | 8/1995 | White | B05B 7/201 |
| | | | | 239/132.5 |
| 6,042,019 | A * | 3/2000 | Rusch | B05B 7/205 |
| | | | | 239/132.3 |
| 2010/0215864 | A1 * | 8/2010 | Baranovski | C23C 24/04 |
| | | | | 427/446 |
| 2016/0008830 | A1 * | 1/2016 | Yamamoto | B05B 7/14 |
| | | | | 239/79 |

* cited by examiner

HIGH VELOCITY OXY AIR FUEL THERMAL SPRAY APPARATUS

CROSS-REFERENCE TO RELATED APPLICATION

This application claims priority to European Application No. 19382945.4 filed Oct. 29, 2019.

TECHNICAL FIELD

This invention relates to the field of thermal spray technologies for applying coatings, and more particularly to high velocity oxy/air fuel spraying apparatus for depositing a coating material on a substrate or for the production of three-dimensional objects by additive manufacturing.

The invention is especially suited for processing metal based and cermet type materials,

STATE OF THE ART

High Velocity Oxy-Fuel (HVOF) processes represent the state of art for the spray deposition of wear and corrosion resistant coatings since their supersonic gas velocities in combination with moderate flame temperatures allow the deposition of optimal coatings with very high bond strengths and compactness, fine surface finishes and low oxide levels. However, new generation coating materials (fine powders), stringent quality requirements and the high productivity demanded by the industry, push the HVOF technologies to their limits.

Because of their high hardness, high wear-resistance and good fracture resistance, hard-metal coatings are attractive and successful composite materials that have been widely used in many industrial applications. In particular, HVOF spray coatings based on tungsten carbide (WC) have been introduced some years ago as an alternative to electrolytic hard chrome (EHC). Such HVOF sprayed coatings have supposed a clear improvement from a technical and environmental perspective. In applications where the coatings will be used in an erosive-corrosive environment, HVOF WC-CoCr coatings are frequently recommended and are, in fact, the current industrial standard as an alternative to EHC. (1) Nevertheless, high carbon loss (i.e. decarburization of WC) and undesired phase transformations in standard HVOF-sprayed hard-metal coatings are well known limitations doing their spray processing very sensitive to limit these effects and to maintain the quality of the WC based coatings. Experimental results have shown that the decarburization of WC is limited to the thermal decomposition of WC to $W_2C$ and carbon. The formation of metallic tungsten in the coating results from the oxidation of $W_2C$. Therefore, the effective suppression of thermal decomposition of WC becomes effective to suppress the formation of tungsten. However, in order to reach a sufficient deformability of the cermet particles upon high velocity impact, it is necessary to heat the feedstock just to melting of the binder phase through spray condition control. (2, 3)

With respect to corrosion protection, the main limitation linked to many thermal spray coatings is the presence of small residual pores and microcracks. Corrosive materials can enter the connected pores and degrade the coating and attack the base material. The pores need either to be eliminated through process optimization for very dense coatings or sealed to prevent the corrosive liquid from entering the coating. The development of curable chemical agents that deeply permeate into small pores for sealing HVOF coatings has proved to be very challenging. And on the other hand, the development of corrosion-resistant metal coatings that are dense enough to prevent the solution from penetrating into the coating is also very challenging.

All these limitations led to a growing interest within the industry in finding thermal spray processes able to operate under "colder" conditions and/or with higher gas velocities looking for very dense and unmodified coatings. In this sense, the development of the cold spray process, using the expansion of inert, heated, high-pressure gases but without involvement of combustion process, allowed several metals like copper and aluminium to be sprayed with superior coating quality. Deposition efficiencies can reach over 90%, with the resulting coatings showing very low porosity levels, minimal phase transformation, decomposition and oxidation of the feedstock material. Process gas temperatures are usually kept in a range that the sprayed particles are never exposed to temperatures close to their melting point. Nevertheless, as deposit build up depends strongly on particle velocity prior to impact, the coating microstructure and mechanical properties are significantly influenced by the spray conditions. It is well known that in CS bonding occurs when the impact velocities of particles exceed a critical value. This critical velocity depends not only on the type of spray material, but also on the powder quality, the particle size and the particle impact temperature. (4, 5) Even if various manufacturers offer a range of CS equipment, each presenting their own advantages and having their potential niche market and with some successful commercial applications, a limited number of materials have been processed with cold spraying on an industrial scale so far, mainly because of the lack of commercially available powders that are particularly designed for this process. (6)

Comparing conventional HVOF spray systems and CS, both processes are characterized by significantly different combinations of particle velocity and temperature. For hard-metals and some high strength metals, these combinations of particle velocity and temperature do not result in the desired coating properties and/or cost-competitive processing parameters (high powder feeding rates, high deposition efficiency). Thus, the current development of thermal spray processes is characterized by the search for an optimum combination of powder particle velocity and temperature while maintaining high powder feed rates and deposition efficiencies. (7)

In general, the different patents claim inventions featuring several systems for spray depositing coatings of carbides, metallic or cermet type of materials, composite materials, alloys, Stainless Steel, and other materials. The deposition Systems are constructed to control and optimize the size, temperature, velocity and composition of the particles sprayed during the deposition process.

WO Patent No. 2009/155702 A1 claims a unique HVOF torch design that allows the gas temperature to vary within a much wider range than any precedent HVOF system (from 800K to 2500K). Gaseous fuel and oxygen are continuously fed into the combustion chamber wherein heat is released. Downstream, large amounts of cold nitrogen are radial injected to regulate temperature. In a similar way, the so-called warm spray process is able control the temperature of the propellant gas in a range approximately from 2300 to 1000 K by injecting room temperature inert gas into the combustion gas jet of an HVOF, so that many powder materials can be deposited in thermally softened state at high impact velocity. (8)

Another alternative technology is High Velocity Air Fuel (HVAF) spraying using air as the oxidizer gas instead of oxygen as in HVOF. While coating quality was very high from the beginning of HVAF development with the "Aerospray" torch (U.S. Pat. Nos. 5,120,582; 5,271,965), significant improvements in the own process and in the performance of coatings have occurred over the last 20 years. After a first improvement of the HVAF gun design by the introduction of a permeable burner block into the internal combustion chamber (U.S. Pat. No. 5,932,293), further progress was made by the introduction of a catalytic member in the internal burner (U.S. Pat. No. 6,245,390) always with the purpose to heat gases and activate the combustion in air-based mixtures. These guns use to be operated with gaseous fuels such as propane and propylene. So far, Activated Combustion HVAF (AC-HVAF) sprayed WCCoCr coatings produced with these technologies, were found to outperform the wear resistance of their HVOF counterparts sprayed with conventional HVOF systems like JP5000 and DJ2600, performing even 20-30 times better than electroplated hard chrome and spray-fused coatings. (9) Some years later, the HVAF gun design was further improved allowing the addition of a liquid fuel to the oxidizer flow and their application to structural components of the permeable burner block for enhanced cooling of the same (US Patent No. 2010/0215864 A1). Furthermore, the introduction of a non-clogging convergent-divergent gas dynamic virtual nozzle (GDVN) in the accelerating nozzle by annularly introducing a coaxial gas flow, through a narrow continuous slot of circumferential ring geometry in the vicinity of the entrance to the diverging outlet bore of the accelerating nozzle (US Patent No. 2011/0229649 A1). Thus, the hot combustion product gases discharged from a combustions chamber are compressed in diameter through the gas dynamic forces exerted by a coaxially co-flowing gas. Furthermore, nowadays, HVAF coatings have by far challenged HVOF deposited WC-CoCr coatings, proving HVAF to be a viable technology with many practical advantages over conventional HVOF systems. (10)

On the other side, liquid fuelled HVOF systems can also be modified by the addition of an inert gas (e.g. $N_2$) for cooling purpose. This is the case of the so-called nanoHVOF® technology, which gains an additional reduction of the effective flame power by changing the design of the combustion chamber. (11) The trademark nanoHVOF®, refers to the suitability of this technology for processing ultra-fine (particles sizes <12 µm) and nanostructured cermet type powders.

Nevertheless, in the race for higher particle velocities with controlled temperatures for high quality coatings, the high-pressure liquid fuelled HVOF guns and the HVAF systems, both uses high power and high volume of gases to run, as opposite to the traditional gas fuelled HVOF systems that work at lower power levels (<200 kW) and moderate consume of gases. The aim of the present invention is to provide the best advantages of both traditional approaches but improving the flexibility in the behaviour of the spraying process to adapt the particle velocities and their temperature to the specific requirements of each coating and powder, and also, to reduce the practical drawbacks found in HVOF and HVAF techniques. To reach this goal, a new combustion torch based on the differential injection of gases into their combustion chamber, developing a local flame holder zone to activate the combustion of difficult to burn mixtures is presented. Also, in combination with the implementation of low temperature fuel gases, as natural gas (methane), and the use of very wide ratios of $O_2$/air mixtures (wide range of energetic conditions and dilution), can lead to much lower flame temperatures (if required) while keeping a stable performance in the supersonic regimen.

DESCRIPTION OF THE INVENTION

A first aspect of the invention relates to a high-velocity thermal spray apparatus comprising:
 a torch's main body housing a labyrinth mixing device and connectors for feeding fuel and oxidizer gases.
 a labyrinth mixing device designed to mix a first oxidizer gas and a fuel under pressure, and to inject the mixture produced into a combustion chamber.
 A torch's front part defining, with the labyrinth mixer, the internal geometry of the combustion chamber, and connecting down-stream to a gas expanding nozzle designed to receive products of combustion of said mixture and form a high-velocity gaseous jet.
 an ignition device to start combustion of said mixture,
 a material delivery device designed to inject a spray material axially into said high-velocity gaseous jet.

According to the invention the labyrinth mixing device comprises one or more flanges which define one or more intermediate mixing volumes between the main body and the own labyrinth mixing device, and holes concentrically placed, both on the flanges and passing through the mixing device and opening at the downstream end of the mixing device, for connecting a fuel-first oxidizer feeding section of the labyrinth mixing device with the combustion chamber.

According to the invention the labyrinth mixing device comprises a crossing axial bore to inject the spray materials (transported by carrier gases) to the combustion chamber (and further to the expansion nozzle).

The high-velocity thermal spray apparatus of the invention comprises several second oxidizer gas injectors for injecting separately a second oxidizer gas up-stream in the combustion chamber to promote the combustion process. The second oxidizer gas injectors open into the combustion chamber at an up-stream peripheral position of the combustion chamber in relation to the gas expanding nozzle to create at least two differential regions, a first diluted, lower oxygen saturation region, generating a colder temperature zone surrounding the mixing device of the first oxidizer gas and fuel, and a second, higher oxygen saturation region generating a hotter temperature zone near the annular peripheral disposition of the second oxidizer injectors up-stream the combustion chamber, such that the spray material is injected axially into the colder temperature zone of the combustion chamber and form a stream of particles accelerated and gradually heated downstream.

In some embodiments the secondary oxidizer gas injectors comprise one or more sequential and closely spaced arrays of narrow continuous slots and/or series of orifices to allow the independent injection of the second oxidizer in one or more sequential and closely spaced injection points of the combustion chamber.

With the apparatus of the invention different mixtures of gases are created at different locations of the combustion chamber, leading to non-uniform conditions for gas combustion and to the development of different flame characteristics inside the combustion chamber. Specifically, stoichiometric or oxygen rich ratios allows the development of high temperature flames in some intended areas of the combustion chamber, but however, other areas are simultaneously characterized by diluted, lean or even non-flammable mixtures of gases. In this way, permanent local oxygen rich areas are intended as flame holders for a very wide range of practical gas parameters or global mixture of gases, allowing the heating, activation, ignition and combustion of the resulting global mixture of gases in the downstream of the combustion chamber and barrel nozzle in such wide range of gas mixtures.

The terms downstream and up-stream must be considered in regard to the movement of advance of the high-velocity gaseous jet.

The fuel and the first oxidizer stream can be injected separately into the torch's body through the corresponding connectors, alternatively they can be pre-mixed outside the torch and further injected. After entering the feeding section of the labyrinth mixing device, the fuel-first oxidizer pre-mixture is pressed through the orifices of the first flange, thus expanding into the first intermediate mixing volume in the following step. The same compression and expansion processes are repeated through the consecutive flanges of the mixing device and further intermediate mixing volume, after which the fuel-first oxidizer mixture is injected according to the defined pattern of holes into the combustion chamber.

The labyrinth mixing device can be designed to be continuously cooled by the internal flow of a mixture of said fuel and first oxidizer and to allow the injection of the said fuel and first oxidizer mixture at different downstream locations forming a colder region of the combustion chamber. This adjacent area, near to the mixer where the mixture from the fuel and the first oxidizer is injected, it is also designed to buffer the contact of the labyrinth mixer device with higher temperature burning areas down-stream the combustion chamber. Additionally, the mixer device, designed with slots and holes in the gas path, works as resistance arrestor against a back-flash.

In some embodiments the internal combustion chamber is designed to generate different combustion conditions inside the geometry of such combustion chamber, as a result of a distribution of locally different mixtures of the first oxidizer gas and fuel, and the separated up-stream peripheral addition of a second oxidizer gas, In some embodiments the labyrinth mixing device is housed partially inside the torch's main body such that the mixing device is closed up at its upstream end by a material delivery device while its downstream end, where the out gas mixture injectors area located, is faced to the combustion chamber, and wherein the torch's body comprises one or more connectors feeding fuel and first oxidizer gas to the fuel-first oxidizer feeding section of the mixing device. The geometry of the combustion chamber is defined between the labyrinth mixing device and the convergent shape of the torch's front part of the torch, wherein such front part opens to the gas expansion nozzle system.

Only with exemplary purpose, the invention can be implemented with natural gas (methane) as low temperature fuel gas and air as the first oxidizer gas. Oxygen gas can be the second oxidizer gas, injected separately by second oxidizer injectors. According to the invention gaseous fuel and air are continuously fed into the mixing region near the mixer down-stream, while oxygen is radial injected into the combustion chamber upstream at different stages to support the combustion process.

The torch of the present invention can operate within a wide range of gas temperatures, while maintaining supersonic gas flame velocities. Gas temperatures can be varied within a wider range when comparing to conventional high-velocity oxy-fuel system essentially thanks to the design of the gas mixing device and the use of different air and oxygen mixtures distributed along the combustion chamber.

In some embodiments the coating material to spray is injected axially into the labyrinth mixing device to the combustion chamber, with the support of a carrier gas from an appropriate external feeder. Additionally, the material delivery device can comprise at least two inlets and one outlet ending inside the labyrinth mixing device, a first inlet for a first gas (coating material carrier gas) stream at a comparatively reduced pressure, used to carry the selected spray material, with a second inlet for a gas stream (injection gas) with an higher pressure, close to the pressure inside the combustion chamber, thus suctioning the first gas stream with the coating material into said labyrinth mixing device and subsequently into the combustion chamber. In some embodiments, the nature of these gases used to inject the coating material into combustion chamber can be selected with additional functionality (inertness, oxidation, fuelling, chemical reaction, . . . ). The coating material can be supplied as spray powder with the adequate characteristics for a right spray processing to generate the aimed coating properties, and also, by means a liquid precursor (solutions, suspensions . . . ) allowing to process fine, typically submicronic sized particles, according to the state of art of this technology.

In some embodiments the coating material is initially treated (heated and accelerated) through their path in the combustion chamber, but it reaches their effective spray conditions (velocity and temperature of the spray material) only after the output from the nozzle, down-stream the combustion chamber. The gas expanding nozzle is provided with an axial nozzle bore, comprising an inlet bore followed by an outlet diverging bore (1° to 6°) that opens downstream. Preferably the radial dimension of the inlet bore of the nozzle is slightly larger (Ø+0.2 to Ø+0.6 mm) than the outlet bore (Ø=8±2 mm) of the convergent outlet section of the combustion chamber to prevent heated powder stream from getting in contact with the walls of the inlet bore. As general rule, the design of the nozzle follows the well-known rules for gas expansion with supersonic flows applied in thermal spraying. In some embodiments, the length of the nozzle is between 20-250 mm with an initial cylindrical section followed by the divergent section down-stream. It is usual that very different coating materials with different physical properties or particle characteristic, require different nozzle geometries for an appropriate treatment during spraying.

In some embodiments the high-velocity thermal spray apparatus comprises a gas collimator device at the output to control the supersonic gas expansion in the ambient.

BRIEF DESCRIPTION OF THE DRAWINGS

To complete the description and in order to provide for a better understanding of the invention, a set of drawings is provided. Said drawings form an integral part of the description and illustrate embodiments of the invention, which should not be interpreted as restricting the scope of the invention, but just as examples of how the invention can be carried out. The drawings comprise the following figures.

DESCRIPTION OF WAYS OF CARRYING OUT THE INVENTION

Figure 1A:
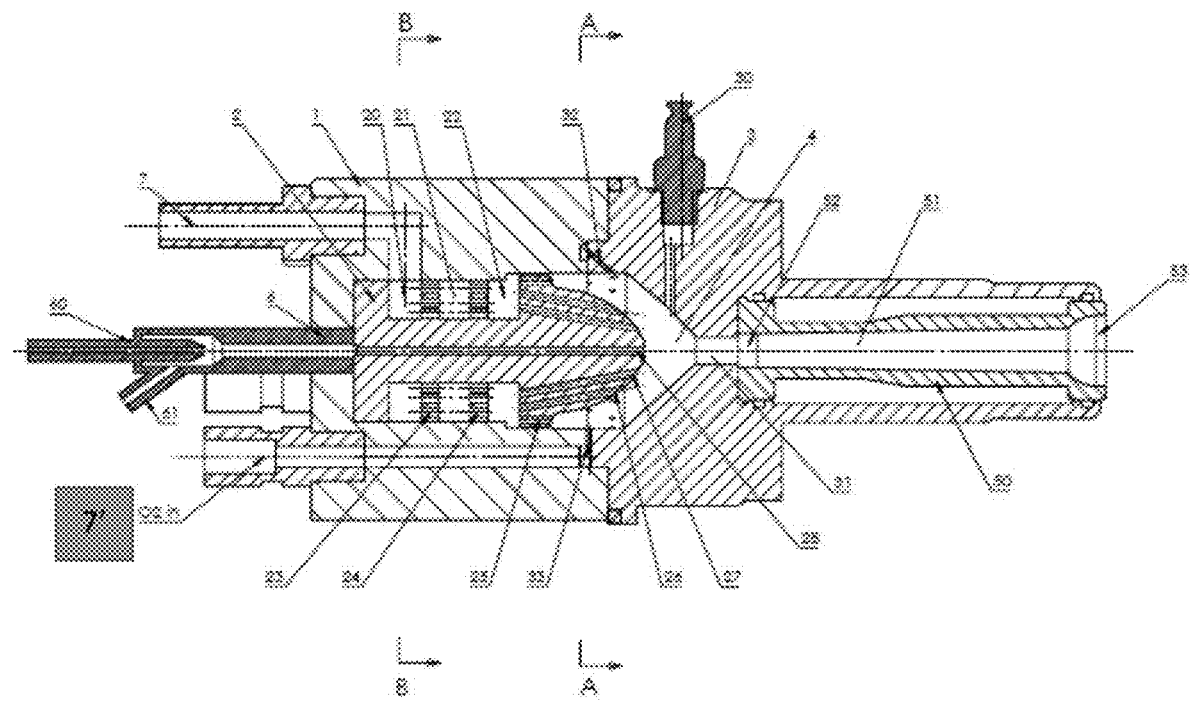
FIG. 1a shows a longitudinal sectional view of the preferred embodiment of the invention, which is a high velocity oxy/air fuel (HVOAF) torch used to spray with supersonic velocity a stream of spray particles to build up a coating of such heated particle on a surface down-stream of the discharge end of the apparatus illustrated.

Referring to the drawings, a better understanding of the present invention may be obtained by reference to FIG. 1a, which is a longitudinal sectional view of a high-velocity oxy/air-fuel (HVOAF) torch constructed in accordance to the preferred embodiment of the present invention. However, the disclosed embodiment is merely exemplary, and it should be understood that the invention may be embodied in many various and alternative forms.

As can be seen in FIG. 1a, the HVOAF torch comprises a main body 1, which houses a labyrinth mixing device 2, comprising two flanges 23 and 24 in the middle section. The labyrinth mixing device 2 comprises an axial crossing bore 28 that is closed up at its upstream end by a material delivery device such as an axial powder injector 6, which receives the end of a gas injection supply tube 60 and the end of a coating material carrier gas supply tube 61. The gas injection supply tube 60 being at a higher pressure than the material carrier gas supply 61.

The main body 1 is fixed to a torch's front part 3, thus forming a combustion chamber 4. The combustion chamber 4 is closed off at its downstream end by a gas expanding nozzle 50, which is provided with an axial nozzle bore, comprising an inlet bore 52 followed by an outlet diverging bore 51 that opens downstream. The radial dimension of an inlet bore 52 should be slightly larger than the outlet bore of the convergent outlet section 31 of the combustion chamber 4 to prevent spray powder stream from getting in contact with the walls of the inlet bore 52.

The labyrinth mixing device 2 is provided with holes 25, 26 and 27, which connect the fuel-air feeding section 20 with the combustion chamber 4. Such holes are concentrically placed both on the flanges 23 and 24 and at the downstream end of the mixing device 2, thus creating two interconnected intermediate mixing volumes 21 and 22.

The fuel and air stream could be pre-mixed outside the torch and injected into the main body through the connectors 7. After entering the fuel-air feeding section 20 of the mixing device 2, the fuel-air pre-mixture is pressed through the orifices of the first flange 23, thus expanding into the first intermediate mixing volume 21 in the following step. The same compression and expansion processes are repeated through the second flange 24 of the mixing device 2 and second intermediate mixing volume 22, after which the fuel-air mixture is injected into the combustion chamber 4.

Figure 2A:
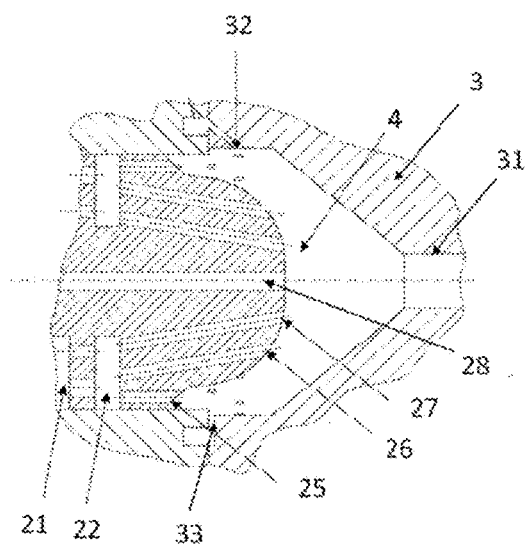
FIG. 2a shows an enlarged partial view of the labyrinth mixing device and combustion chamber of FIG. 1.
Figure 2:
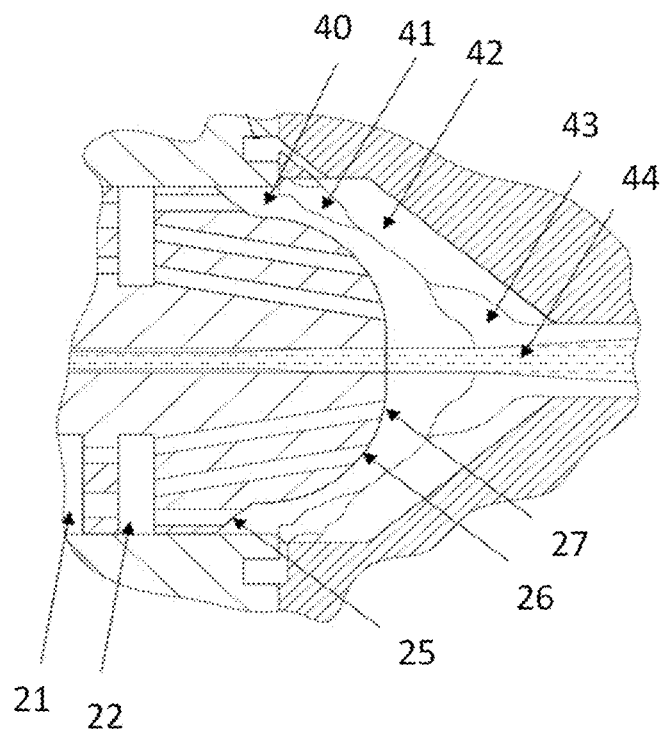
FIG. 2b shows an enlarged partial view of the labyrinth mixing device and combustion chamber like FIG. 2a, showing the high-velocity gaseous gas and different temperature regions generated inside the combustion chamber.
Figure 3:
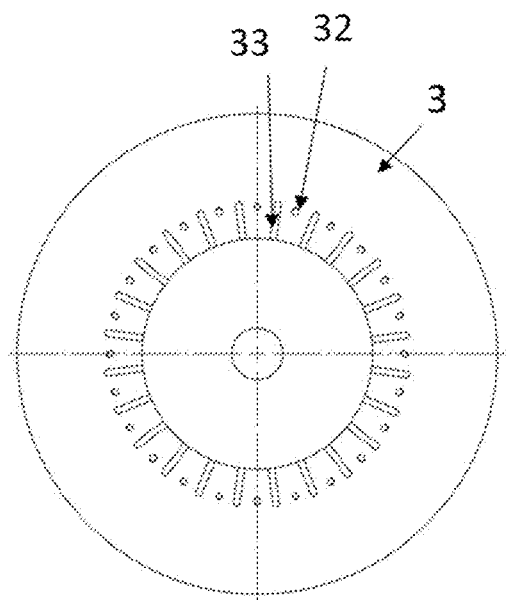
FIG. 3 shows the second oxidizer injectors as a rear-view A-A' of the combustion chamber case illustrating the inlet channels and orifices through which the second oxidant gas is injected into the combustion chamber.
Figure 4:
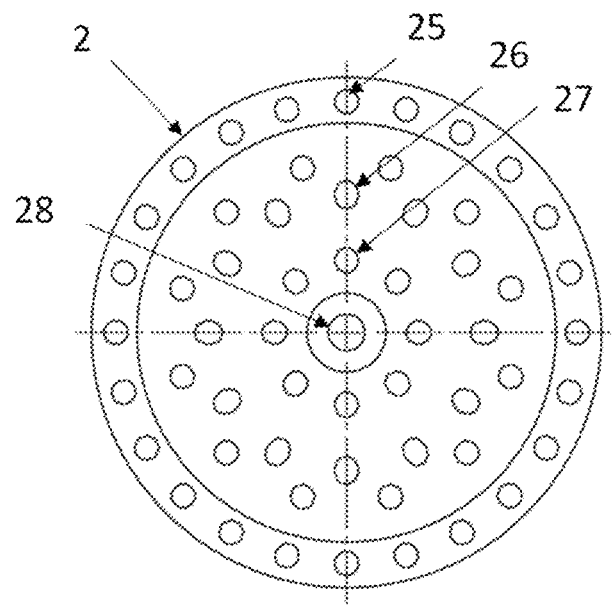
FIG. 4 shows a frontal view of the labyrinth mixing device illustrating the circular series of closely spaced orifices through which the fuel and first oxidant mixture is fed into the combustion chamber.
Figure 5:
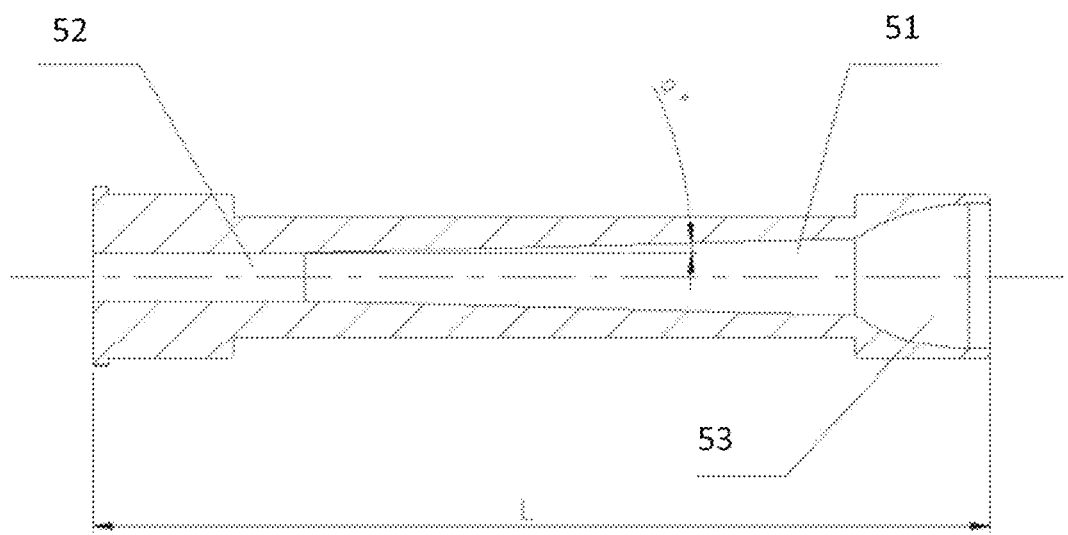
FIG. 5 shows an enlarged sectional view of a nozzle illustrating their main parts as the first inlet cylindrical bore, the second divergent bore and the collimator output.
Figure 6:
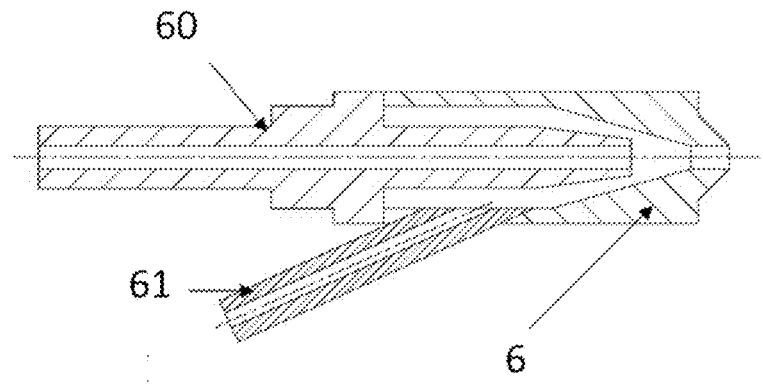
FIG. 6 shows an enlarged, sectional view of the embodiment with an additional material delivery device (for example a powder injector) illustrating the nature of the venturi type design that allows injecting the powder axially into the gas expanding jet.
Figure 7:
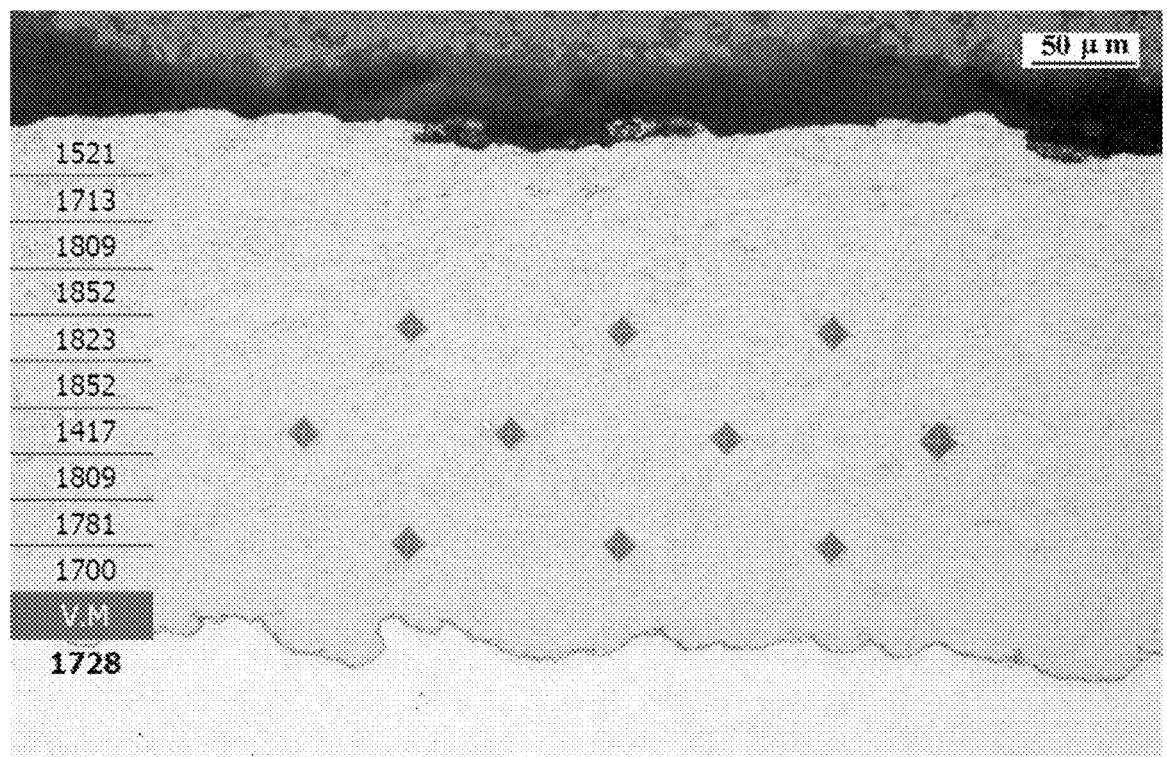
FIG. 7 shows the microstructure of a cermet type coating (WCCoCr sintered powder) obtained with the apparatus of the invention as example of very hard coatings that can be produced. Shows WC-CoCr cermet-microhardness indentations 1728HV0,3.
Figure 8A:
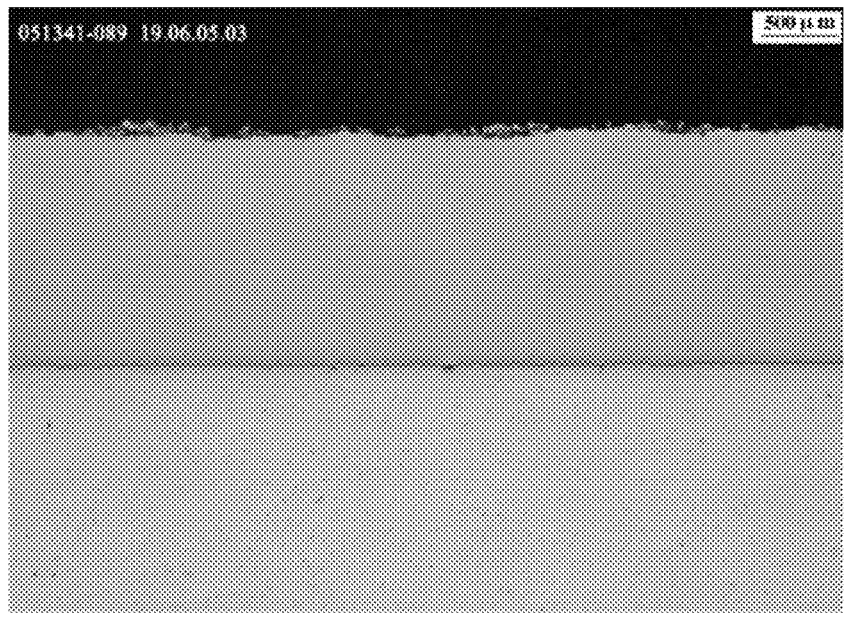
FIG. 8a shows the microstructure of a first aluminium type coating (AlSi16Sc0.4Zr0.2 powder) obtained with the apparatus of the invention as example of processing of aluminium alloys without experiencing the sticking of particles into barrel. Shows AlSi16Sc0.4Zr0.2 coating as sprayed metallographic cross section.
Figure 8B:
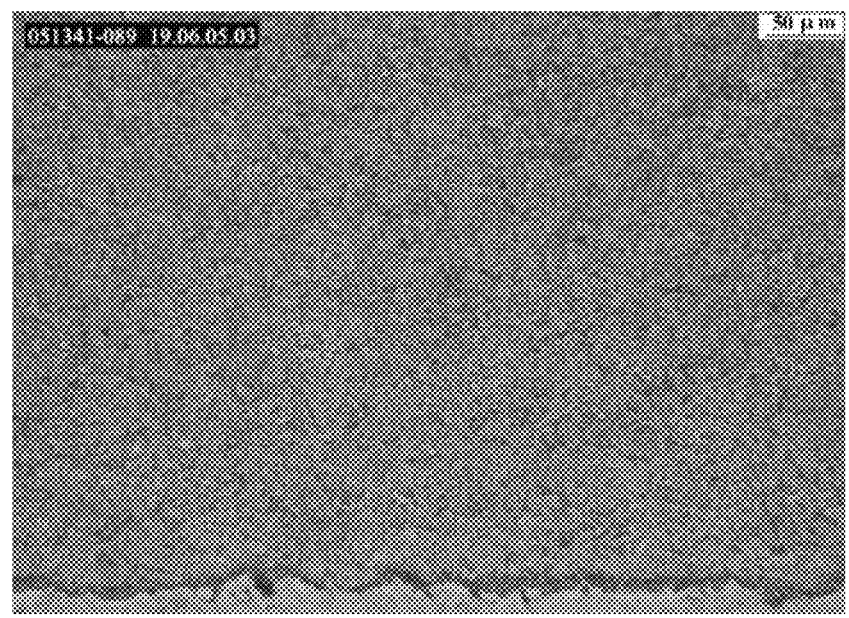
FIG. 8b shows the etched microstructure of a first aluminium type coating (AlSi16Sc0.4Zr0.2 powder) obtained with the apparatus of the invention. Shows AlSi16Sc0.4Zr0.2 coating metallographic cross section etched.
Figure 9:
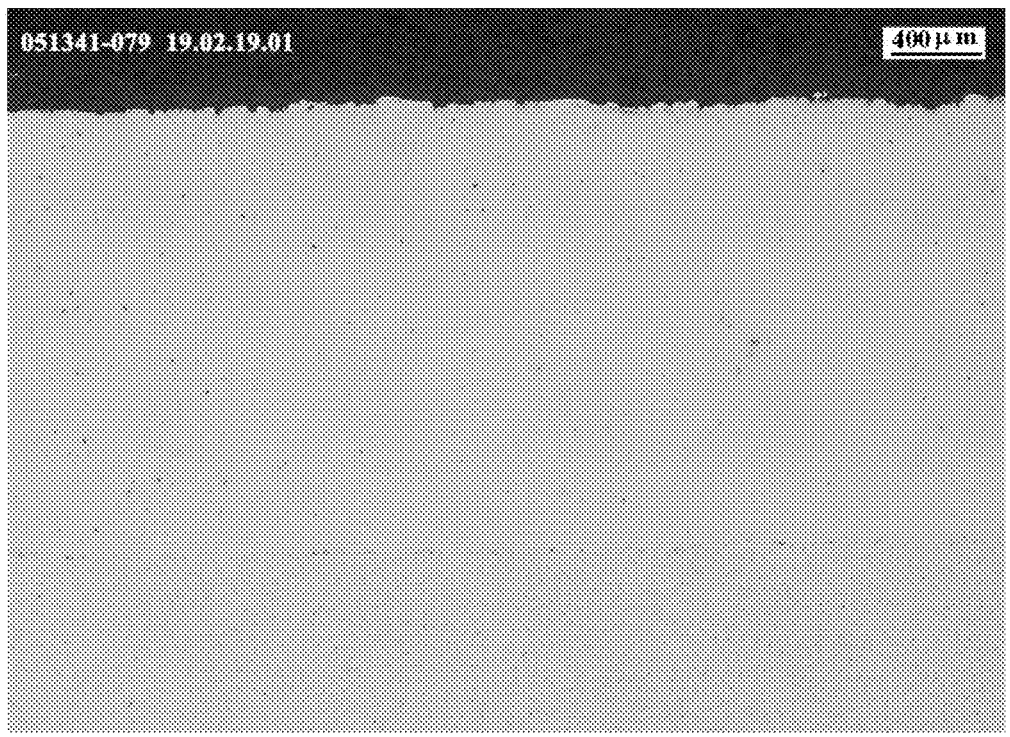
FIG. 9 shows the microstructure of a second aluminium (99,9% powder) type coating obtained with the apparatus of the invention as example of processing aluminium alloys. Shows aluminum coating as sprayed metallographic cross section.
Figure 10:
FIG. 10 shows the microstructure of a bronze type coating obtained with the apparatus of the invention as example of processing cupper base alloys. Shows bronze coating as sprayed metallographic cross section.
Figure 11:
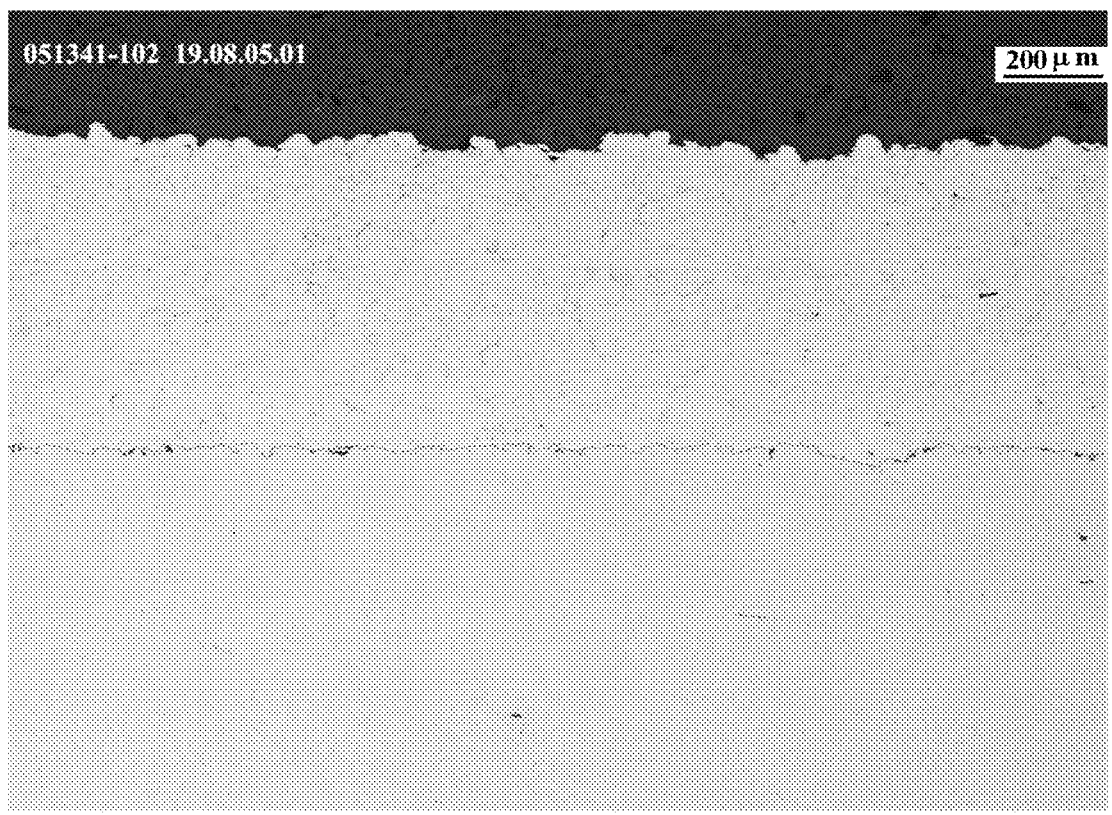
FIG. 11 shows the microstructure of a hot work tool steel type of coating (Heatvar Uddelhom) obtained with the apparatus of the invention as example of processing steel and metallic alloys. Shows tool steel (Heatvar) as sprayed metallographic cross section

Inside the combustion chamber 4, the oxygen gas stream is fed at two sequential locations, firstly through an array of narrow continuous slots 33 and lately though a circular series of orifices 32, both closely spaced along circumferential rings at the up-stream end of the front part 3, as schematically shown in FIG. 3. The combustion mixture is then ignited with the help of a sparkplug 30, which is placed in a radial orifice at the downstream of the front part 3. Such a radial orifice ends in the combustion chamber 4. This sequential array of fuel-air and oxygen injection points lead to the creation of several combustion regions featuring substantially different temperatures from different dilution degrees and oxidant to fuel ratios, as schematically shown in FIG. 2b. In the proximity of the cylindrical section wall at most up-stream end, the fuel-air mixture generates a zone in the combustion chamber with usually high level of dilution, thus building a low-temperature region 40, which evolves forming a sort of boundary that surrounds the mixing device 2 wall until it embeds the particle jet stream 44. At the junction zone between the labyrinth mixing device 2 and the front part 3, the first array of oxygen injectors 33 provides for a sudden increase of oxygen saturation and thus to an equivalent increase in the temperature of the gaseous combustion mixture in this combustion region 41. Few millimetres downstream, in the walls of the combustion chamber, the second array of oxygen injectors 32 provides for an additional supply of oxygen, thus newly increasing the oxidant to fuel ratio and, in consequence, the gas temperature in this combustion region labelled as 42 in FIG. 2b. Upon reaching the proximity of the low temperature region 40, both flow streams mix together, embed the particle stream 44 and build a fourth combustion region 43 with an intermediate temperature around it. In this way, the feedstock material is injected into the coldest region of the combustion chamber and is gradually heated up along its way throughout the gun nozzle 50.

In the preferred embodiment of the present invention, the powder injector 6 allows the implementation of low-pressure carrier-gas streams to carrier the feedstock powder material into the torch (inlet tube 61), since a high-pressure gas-injection stream (inlet tube 60) provides a suction of the low-pressure gas stream into the injector 6 and lately into the mixing device 2, crossing it through the axial bore (28) to the combustion chamber 4.

REFERENCES (1) L.-M. Berger. Application of hardmetals as thermal spray coatings. Int. Journal of Refractory Metals and Hard Materials 49 (2015), pp. 350-364.
(2) Chang-Jiu, L. and G.-J. Yang. Relationships between feedstock structure, particle parameter, coating deposition, microstructure and properties for thermally sprayed conventional and nanostructured WC-Co. Int. Journal of Refractory Metals and Hard Materials, 39 (2013), pp. 2-17.
(3) T. Varis et al. Formation Mechanisms, Structure, and Properties of HVOF-Sprayed WC-CoCr Coatings: An Approach toward Process Maps. J. Therm. Spray Technol. Volume 23(6) August 2014, pp. 1009-1018.
(4) T. Schmidt, F. Gartner, H. Assadi, H. Kreye: Development of a generalized parameter window for cold spray deposition, Acta Materialia 54 (2006), pp. 729/742.
(5) Raletz, F., Vardelle, M. and Ezo, G.: Critical particle velocity under cold spray conditions, Surface & Coatings Technology 201 (2006), pp. 1942/1947.
(6) A. Vardelle et al. The 2016 Thermal Spray Roadmap. Journal of Thermal Spray Technology, Volume 25(8) December 2016, p. 1376-1440.
(7) L.-M. Berger, R. Puschmann, J. Spatzier and S. Matthews. Potential of HVAF Spray Processes. Thermal Spray Bulletin 1/13, p. 16-20.
(8) Seiji Kuroda, Makoto Watanabe, KeeHyun Kim, and Hiroshi Katanoda. Current Status and Future Prospects of Warm Spray Technology. J. Therm. Spray Technol. Volume 20(4) June 2011, pp. 653-676.
(9) A. Verstak and V. Baranovski: AC-HVAF Sprayed Tungsten Carbide: Properties and Applications. Building on 100 Years of Success: Proceedings of the 2006 International Thermal Spray Conference, B. R. Marple, M. M. Hyland, Y. C. Lau, R. S. Lima and J. Voyer, Eds., May 15-18, 2006 (Seattle, WA, USA), ASM International, Materials Park, OH, 2006.
[1]G. Bolelli et al. Tribology of HVOF- and HVAF-sprayed WC-10Co4Cr hardmetal coatings: A comparative assessment. Surface & Coatings Technology 265 (2015) 125-144.
(10) V. Wesling, R. Reiter, L. Lau and G. Matthaus. nanoHVOF—Process technology for and properties of a new high density protective coating. Mat.-wiss. u. Werkstofftech. 2014, 45, No. 6.

What is claimed is:

1. A high-velocity thermal spray apparatus for depositing a material on a substrate as a surface coating or for building up a bulk material as additive manufacturing comprising:
a labyrinth mixing device (2) designed to mix a first oxidizer gas and a fuel under pressure, and to inject the mixture produced into a combustion chamber (4), thus generating a low temperature diluted combustion mixture near the labyrinth mixing device in the combustion chamber, the first oxidizer gas being air,
a torch's main body (1) housing the labyrinth mixing device (2) and connectors (7, 7') for fuel and oxidizer gases, air as the first oxidizer gas and oxygen as a second oxidizer gas,
a torch's front part (3) defining, with the labyrinth mixing device (2), the internal geometry of the combustion chamber (4), and connecting down-stream to a gas expanding nozzle (50) designed to receive products of combustion of said mixture and form a high-velocity gaseous jet,
an ignition device (30), placed at the front part (3), to start combustion of the combustion mixture in the combustion chamber,
a material delivery device (6) designed to inject a spray material axially into said high-velocity gaseous jet;
several radial second oxidizer gas injectors (32,33), at a junction zone between the labyrinth mixing device (2) and the front part (3), for injecting separately oxygen as the second oxidizer gas upstream in the combustion chamber to promote the combustion and gradually increase an oxidant to fuel ratio of the mixture of the fuel and the first oxidizer gas from the mixing device, the second oxidizer injectors (32, 33) opening into the combustion chamber (4) at an up-stream peripheral position of the said chamber in relation to the gas expanding nozzle (50) to create at least two differential regions, a first dilute, lower oxygen saturation region, generating a colder temperature zone, surrounding the mixing device, of the first oxidizer gas and fuel, and a second, higher oxygen saturation region generating a hotter temperature zone near the annular peripheral disposition of the second oxidizer injectors upstream the combustion chamber, such that the spray material is injected axially into the colder temperature zone of the combustion chamber and form a stream of particles accelerated and gradually heated downstream,
and wherein the labyrinth mixing device (2) comprises one or more flanges (23,24) which define one or more mixing volumes (21,22), between the main body (1) and the labyrinth mixing device (2), and holes (25,26, 27), concentrically placed both on the flanges (23,24) and passing through the mixing device (2) and opening at the downstream end of the mixing device (2) for connecting a fuel-first oxidizer feeding section (20) of the labyrinth mixing device (2) with the combustion chamber (4),
and wherein the labyrinth mixing device (2) further comprises a crossing axial bore (28) to inject the spray material into the combustion chamber (4),
and wherein said material delivery device (6) comprises at least two inlets (60,61) and one outlet ending inside the axial bore of the labyrinth mixing device (2), a first inlet (61) for a first carrier gas stream at a first pressure, used to carry the selected spray material, and a second inlet (60) for an injection gas stream with a second pressure higher that the first pressure and higher than the pressure inside the combustion chamber (4), thus suctioning the first carrier gas stream with the coating material into said labyrinth mixing device (2) and subsequently into the combustion chamber (4) and expanding nozzle (50).

2. A high-velocity thermal spray apparatus as in claim 1 wherein said secondary oxidizer gas injectors comprises one or more sequential and spaced arrays of continuous slots and/or series of orifices (32,33) to allow the independent injection of the second oxidizer in one or more sequential and closely spaced injection points of the combustion chamber (4).

3. A high-velocity thermal spray apparatus according to claim 1, wherein the combustion chamber is designed to generate different combustion conditions inside the geometry of such combustion chamber, as result of a distribution of locally different mixtures of the first oxidizer and fuel, and the separated up-stream addition of a second oxidizer.

4. A high-velocity thermal spray apparatus according to claim 1, where the low temperature diluted combustion mixture is created at outlets of the holes of the labyrinth mixing device (40) in the combustion chamber.

5. A high-velocity thermal spray apparatus according to claim 1, wherein an oxygen rich, high temperature flame area (42) is created downstream of the several second oxidizer injectors in the combustion chamber.

6. A high-velocity thermal spray apparatus as in claim 1, wherein the labyrinth mixing device (2) is housed inside the torch's main body (1) such that the mixing device (2) is closed up at its upstream end by a material delivery device (6) while its downstream end is located inside the combustion chamber (4), and wherein the torch's main body (1) comprises at least one connector (7) feeding fuel and first oxidizer gas stream to the feeding section (20) of the labyrinth mixing device (2).

7. A high-velocity thermal spray apparatus as in claim 1, wherein the geometry of the combustion chamber is defined between the labyrinth mixing device (2) and a convergent shape of the front part (3) of the torch, wherein such front part opens to the gas expanding nozzle (50).

8. A high-velocity thermal spray apparatus as in claim 1, wherein the nature of the gases of the injection gas stream flowing through inlet (60) are selected for additional functionality as oxidizing, fuelling, dilution, chemical reaction enhancement, or others.

9. A high-velocity thermal spray apparatus as in any of the previous claims wherein the gas expanding nozzle (50) is provided with an axial nozzle bore, comprising the first inlet cylindrical bore (52) followed by a second outlet diverging bore (51) that opens downstream.

10. A high-velocity thermal spray apparatus as in claim 9 wherein the radial dimension of an inlet bore (52) of the nozzle (50) is larger than the outlet bore (31) of the convergent outlet section (31) of the combustion chamber (4) to prevent spray powder stream from getting in contact with the walls of the inlet bore (52).

11. A high-velocity thermal spray apparatus as in claim 9, wherein the length of the gas expanding nozzle (50) is chosen between 20 and 250 mm.

12. A high-velocity thermal spray apparatus as in claim 9, wherein the gas expanding nozzle (50) has a gas collimator device (53) at the output to control the supersonic gas expansion in the ambient.

* * * * *